United States Patent [19]

Nordlund

[11] Patent Number: 4,710,032
[45] Date of Patent: Dec. 1, 1987

[54] ARRANGEMENT FOR PREPARING A CHARGE OF COMPOSITIBLE MATERIAL FOR A COMPOSTING PLANT

[75] Inventor: Tore H. Nordlund, Torshälla, Sweden

[73] Assignee: Purac AB, Lund, Sweden

[21] Appl. No.: 854,835

[22] Filed: Apr. 23, 1986

[30] Foreign Application Priority Data

Apr. 29, 1985 [SE] Sweden .................................. 8502087

[51] Int. Cl.$^4$ ............................................. B01F 15/02
[52] U.S. Cl. ..................................... 366/156; 366/133; 366/134; 366/177; 366/186
[58] Field of Search ........................ 366/20, 35, 38, 49, 366/76, 150, 151, 177, 156–158, 186, 133, 182, 134, 603

[56] References Cited

U.S. PATENT DOCUMENTS 4,506,982  3/1985  Smithers et al. ................. 366/156 X
4,509,862  4/1985  High et al. .......................... 366/158
4,548,507  10/1985  Mathis et al. .................... 366/156 X Primary Examiner—Timothy F. Simone
Attorney, Agent, or Firm—Fred Philpitt

[57] ABSTRACT

The invention relates to an arrangement for preparing compostible material for introduction into a composting plant, the material containing sludge and carbon-bearing material. The arrangement includes a first conveyor which co-acts with a respective supply means for the sludge and carbon-bearing material; a mixer for mixing the sludge and carbon-bearing material together; a second conveyor for transporting the resultant mixture of sludge and carbon-bearing material to the composting plant; a residence tank for accommodating composted material; a third conveyor for transporting composted material; a third conveyor for transporting composted material to the upper part of the residence tank; a first feed means provided in the upper part of the residence tank and operative to feed composted material to a first outlet for finished product; and a second feed means provided in the power part of the residence tank, this second feed means being arranged, when driven in one direction of rotation, to feed composted material to a second outlet and from there, via the mixer, to the second conveyor together with the sludge and carbon-bearing material.

3 Claims, 1 Drawing Figure

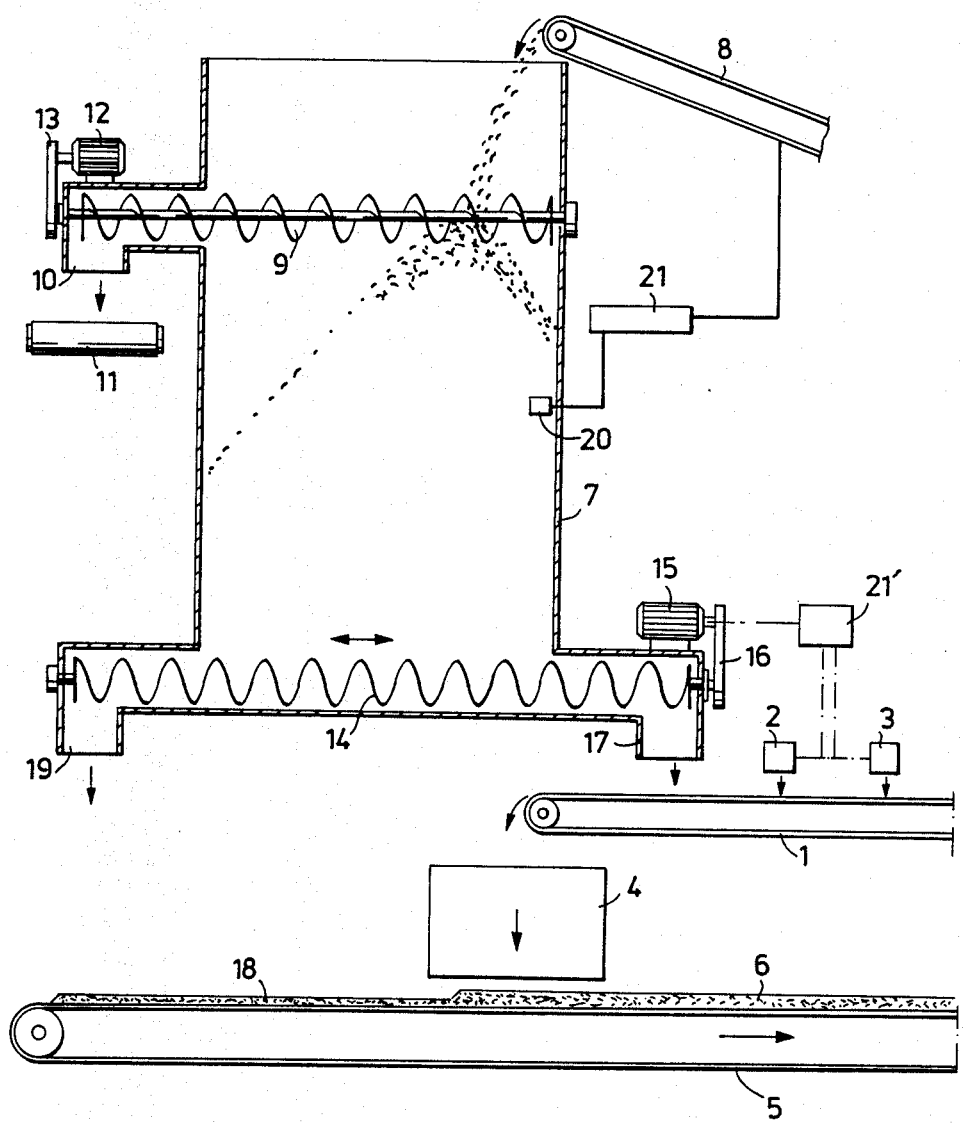

ARRANGEMENT FOR PREPARING A CHARGE OF COMPOSITIBLE MATERIAL FOR A COMPOSTING PLANT

The present invention relates to an arrangement for preparing for introduction into composting plant a charge of compostible material containing sludge and a carbon-bearing material.

It is known to compost sludge by adding thereto a carbon-bearing material in order first to convert the sludge to a compostible form; in this context the word sludge refers to the slime product derived from sewage purification plants. The carbon-bearing material may comprise such waste products as sawdust, woodshavings and bark, although peat and similar materials may also be used. According to one method, compostible material is introduced into the top of a large composting container and caused to pass in a coherent mass from an upper level in the container down therethrough, and the necessary oxygen-containing gas required to decompose the material, with the aid of microorganisms, is passed through the compostible material in contraflow thereto. The fully or partially composted material is taken-out at the bottom of the container, for example by cutting-away the lower regions of the composted mass with the aid of reciprocatingly rotating screws. By taking the composted material from the bottom of the coherent mass, the mass is caused to move down through the container gravitationally, in time with the rate at which composting of the material is effected to the result desired. The waste gases generated by the composting process, and containing carbon dioxide and water vapour formed during said process, may leave through the top of the container from a layer of coherent mass that is still unheated. When the composting mass is saturated with water vapour, difficulties may be experienced in preventing the water vapour from condensing in the upper colder layer of material present in the container. This may result in a concentration of water in this layer of material to be composted. This water-enriched layer then forms a seal which impedes the passage of the gasses through, therewith increasing the power required to drive the fans etc. This drawback can be overcome by withdrawing the exhaust gas by suction from a zone located beneath the level of the solid mass of material in the container. The process can be realised technically by drawing-off the gases through a collecting pipe for waste gases at the upper level of the mass of solid material in the container. The collecting pipe is connected to branch pipes which extend across the whole of the container and which have connected thereto nozzle-like pipes which extend down into the mass to be composted. The pressure at the end of each nozzle-like pipe can be lowered to a level at which air can be caused to flow through the container from the upper level of the material and through the container in conflow with the material to be composted.

It can be said in general that each composting process needs to be controlled accurately and precisely and that precise conditions must be maintained in the composting zone in order to achieve the results desired, i.e. primarily a product in which the harmful pathogenic microorganisms present have been killed. One factor which is highly significant in enabling the correct process conditions to be maintained resides in the nature of the starting material, i.e. the properties of the sludge. This material may contain widely varying quantities of water, causing its viscosity to vary. In addition, the availability of slude for composting processes may also vary. In view of this, previous procedures have involved recycling to the process a given quantity of composted material taken from the bottom of the composting container, this recycled quantity of compost being used as a third component in admixture with the starting material, i.e. the sludge and the carbon-bearing material. In this known method, the material is conveyed immediately to the mixing station, causing the composition of the resultant mixture to vary excessively. For example, when composted material is taken from the container and finely divided with the aid of reciprocatingly movable and rotatable screws, the quantity of composted material taken is liable to vary in dependence on the direction in which the rotating screws move. This causes disturbances in operation and subsequent drawbacks, which should be reduced. Another factor of significance in the aforesaid context involves the removal of composted material from the bottom of the container. When practicing prior art methods it is necessary to remove a sufficiently large quantity of composted material from the lower part of the container prior to charging a new batch of compostible mixture to the upper part thereof, so that the steps of mixing a new compostible batch and charging the batch to the container can be effected in stages capable of being applied in practice. As a result, the upper level of the coherent mass of composting material in the container is lowered to such an extent, due to sinking of the mass in the container, that disturbances in operation are unavoidable. In those processes carried out in a reactor vessel or container in which waste gases are withdrawn by suction at the top of the container from a zone located beneath the upper level of the coherent composting mass, it has been found essential to maintain the level from which the gases are exhausted constant, and to ensure that the fresh material charged to the container provides a layer whose properties do not vary excessively.

It has now been found that the aforedescribed drawbacks and disadvantages can be overcome by complimenting the composting plant with an arrangement which incorporated a residence tank for holding composted material taken from the composting plant, and from which tank composted material can be taken at the same time and either despatched as a finished product or supplied to a mixer for admixture with the material to be composted.

An arrangement with which the aforesaid drawbacks can be overcome is characterized in that it includes a first conveyer having means for supplying the sludge and the carbon-bearing material, a mixer for mixing the sludge and carbon-bearing material together, a second conveyor for transporting the mixture of sludge and carbon-bearing material to the composting plant, a residence tank for the accommodation of composted material, a third conveyor for transporting composted material to the upper part of the residence tank, a first feed means located in the upper part of the residence tank and operative in feeding composted material to a first outlet for the finished product, and a second feed means located in the lower part of the residence tank and, when rotated in one direction, operative in feeding composted material to a second outlet, and from there, via the mixer, to the second conveyor together with the sludge and carbon-bearing material.

According to one embodiment of the invention, the second feed means provided in the lower part of the residence tank may be arranged, when driven in an opposite direction, to feed composted material from the residence tank to a third outlet for discharging the material to the second conveyor.

The invention will now be described with reference to an embodiment thereof illustrated in the accompanying drawing.

The illustrated arrangement includes a first conveyor 1 having arranged thereabove a first supply means 2, from which it receives sludge obtained from a sewage purification works, and a second supply device 3, from which it receives carbon-bearing material, in this case in the form of sawdust. The conveyor belt transports the two materials to a mixer 4, in which the materials are mixed thoroughly together. The resultant mixture is compostible, by which is meant that it can be decomposted to compost form in the presence of suitable microorganisms. The mixture of sludge and carbon-bearing material is deposited from the mixer 4 onto a second conveyor belt 5 in a relatively thick layer 6, which is charged to the upper part of the composting plant (not shown). The arrangement also includes a residence tank 7 for composted material taken from the same composting plant, with the aid of a third conveyor belt 8. The upper part of the residence tank 7 has located therein a rotatable feed screw 9 which when rotated moves gripable, composted material located on a level above the lower outer defining lane of the screw to an outlet 10 through which the material is fed to a conveyor 11 for further transportation to a storage station or to a plant where the material is finally composted or matured and stored in the open air. The feed screw 9 is driven by a motor 12 via a transmission 13. Located in the lower part of the residence tank 7 is a second rotatable feed screw 14 which is driven by means of a motor 15 and a transmission 16 in a direction in which the screw moves composted material from the residence tank 7 to a second outlet 17, from which compostible material is fed down onto the conveyor belt 1, where it forms timewise a further mixing component, which is supplied to the mixer 4 together with the sludge and carbon-bearing material. During other time periods the feed screw 14 is arrranged to rotate in the opposite direction, and therewith to feed compostible material to a third outlet 19 and from there down onto the conveyor belt 5, so as to form a layer 18, which is charged to the upper part of the composting plant for further composting in a second stage. The residence tank 7 also has provided therein a level regulator 20 which controls operation of the conveyor belt 8, together with the belt loading devices, via suitable control means 21, and increases the capacity of said loading devices when the level of composted material falls beneath a given desired level.

Thus, the composted material supplied to the residence tank 7 be means of the conveyor belt 8 can be discharged from the tank in three mutually different ways, i.e. through one of the outlets 10, 17 and 19, and can be allowed to stay in the tank for periods of time contingent on the desired operating conditions in the composting plant. In combination with a controlled centre 21', the arrangement enables compost to be manufactured in a troublefree manner even, for example, should the properties of the sludge supplied vary with time. The composting reactor vessel or container can be unloaded and filled continuously while constantly, at the same time, the upper surface of the coherent mass in the container at approximately a normal level.

I claim:

1. An arrangement for preparing a charge for composting, which charge includes sewage sludge, a carbon-carrier and material that has already been composed, said arrangment comprising
   (a) a first conveyor (1),
   (b) a first supply means for supplying sewage sludge and a carbon-carrier to said first conveyor,
   (c) a second supply means for supplying already composted material to said first conveyor,
   (d) a mixer for mixing together the materials received from said first and second supply means,
   (e) a second conveyor (5) for receiving the material discharged from said mixer and delivering it to a composting plant,
   (f) a residence tank (7) for receiving composed material from a composting plant,
   (g) a third conveyor (8) for conveying composted material from said composting plant to said residence tank (7),
   (h) a first feeding means in the upper part of said residence tank (7) that is adapted to feed composted material from a first level in said residence tank (7) to a first outlet for the final composted product, and
   (i) a second feeding means (14) adjacent the lower part of said residence tank (7) for feeding composted material withdrawn from the residence tank (7) to said second supply means (c).

2. An arrangement according to claim 1 wherein said second feed means (14) provided in the lower part of said residence tank (7) is arranged to be also driven in a second direction so as to feed composted material from said residence tank (7) to a third outlet (19) through which the composted material is discharged upon said second conveyor (5).

3. An arrangement according to claim 1 which includes a level monitor (20) for indicating the lowest permitted level in the residence tank (7).

* * * * *